US006910602B2

United States Patent
Hasaka et al.

(10) Patent No.: US 6,910,602 B2
(45) Date of Patent: Jun. 28, 2005

(54) CONTAINER VALVE (75) Inventors: Satoshi Hasaka, Tokyo (JP); Yutaka Horiuchi, Saitama (JP); Masao Koizumi, Fuchu (JP)

(73) Assignees: Taiyo Nippon Sanso Corporation, Tokyo (JP); Hamai Industries Limited, Tokyo (JP)

( * ) Notice: Subject to any disclaimer, the term of this patent is extended or adjusted under 35 U.S.C. 154(b) by 155 days.

(21) Appl. No.: 10/304,812

(22) Filed: Nov. 26, 2002

(65) Prior Publication Data

US 2003/0102051 A1 Jun. 5, 2003

(30) Foreign Application Priority Data

Nov. 30, 2001 (JP) ........................................ 2001-367045

(51) Int. Cl.[7] ............................ B67D 5/58; B65D 83/00
(52) U.S. Cl. .................... 222/3; 222/189.1; 222/396; 222/397; 222/400.7
(58) Field of Search ............................... 222/3, 189.06, 222/189.1, 190, 396, 397, 400.7

(56) References Cited

U.S. PATENT DOCUMENTS

| 5,022,423 A | * | 6/1991 | Britt | 137/68.14 |
| 6,101,816 A | | 8/2000 | Wang et al. | |
| 6,360,546 B1 | * | 3/2002 | Wang et al. | 62/48.1 |

* cited by examiner

Primary Examiner—Gene Mancene
Assistant Examiner—Patrick Buechner
(74) Attorney, Agent, or Firm—J.C. Patents (57) ABSTRACT A container valve, attached to a gas container, wherein the container valve has a pressure reducing function, and is inside a valve block in the gas container. In the valve block, the container valve comprises a gas filling passage in which a filling valve is installed, a gas lead-out passage in which a lead-out valve is installed, and a pressure regulator arranged at an upstream side of the lead-out valve in the gas lead-out passage. The container valve can safely supply gas under a reduced pressure for use by opening the container valve of a container whose pressure is high and gas can be filled easily into the container. The container valve can be miniaturized and the purging operation for supplying high purity gas can be performed.

3 Claims, 7 Drawing Sheets

CONTAINER VALVE

CROSS-REFERENCE TO RELATED APPLICATION

This application claims the priority benefit of Japanese application serial No. 2001-367045, filed on Nov. 30, 2001.

BACKGROUND OF THE INVENTION

1. Field of the Invention

This invention relates in general to a container valve with pressure reducing function, and more specifically relates to a valve with a structure suitable for a gas container filled with various gases that have the characteristics of being inflammable, spontaneous-flammable, and toxic, corrosive and combustible-supportability.

2. Description of Related Art

Gas used in industry (industrial gas) is often high-pressure gas having dangerous characteristics such as being inflammable, spontaneous-flammable, and toxic, corrosive and combustible-supportability. The gas is supplied to and consumed by consumption equipment. This makes it difficult to maintain safety. Especially in the semiconductor industry, the larger the diameter of a wafer is, the more semiconductor gas with dangerous characteristics consumed. Still severer management must be increasingly performed to maintain safety.

Generally, the method for supplying industrial gas is as follows. The gas is filled into a high-pressure container under high pressure. A pressure regulator is arranged on the gas supplying line. The gas with high-pressure is reduced to a specific consumption pressure (1 Mpa or less is usual) by the pressure regulator. In the High-Pressure Gas Safety Law in Japan, the necessary techniques for using special high-pressure semiconductor gas such as silane, disilane, arsine, phosphine, diborane, hydrogen selenide and germane are stipulated in detail. Even though the consumption thereof is little, the consumption must be registered to the prefectural governor. Especially, parts in the high-pressure portion inside the cylinder cabinet must use the parts authorized by the High-Pressure Gas Safety Institute of Japan, wherein the high-pressure portion is from the connection portion of the container to the pressure regulator. There are two drawbacks: high danger with gas leakage due to the existence of the high-pressure portion and high cost due to using the authorized parts.

On the other hand, sometimes an adsorbent like zeolite or active carbon is filled into the container. The adsorbent absorbs the liquefied gas under pressure lower than the atmospheric pressure, wherein the liquefied gas is like phosphine, arsine, diborane and germane etc. The technique for supplying gas under this condition is practiced where the filling amount is seven to forty times compared with a container with the same volume for filling high-pressure gas without absorbent. Although the technique has great merit in terms of filling amount, it also has the problem that the gas cannot be supplied unless the pressure of consumption equipment is 10 or less than 10 Torr. This technique can only be used in the semiconductor industry using ion implantation or high-density plasma CVD etc. Furthermore, because the absorbent is used, it is difficult to remove the atmospheric impurity absorbed by the adsorbent. Additionally, because the adsorbent is also the source for generating particles, high purity gas cannot be provided.

A container which can supply gas under low-pressure is proposed referring to the Japan Laid-open publication no. 2001-510546, wherein a highly integrally formed pressure regulator and container valve are attached to the container. Since this container is not functional to efficiently fill the container with gas, because it is difficult to exhaust the container into a vacuum state before filling the gas and the filling speed is slow. As a result, the filled gas is of low purity. Furthermore, the remaining amount of gas cannot be managed with the low-pressure inside the container.

SUMMARY OF THE INVENTION

Here, an objective of this invention is to provide a container valve that can safely supply gas under reduced pressure when opening the container valve wherein the pressure inside the container remains high.

Another objective of this invention is to provide a container valve in which gas can be filled easily.

Another objective of this invention is to provide a container valve that can be made miniaturized.

Another objective of this invention is to provide a container valve with a pressure reducing function that can perform a purging operation for supplying high purity gas.

For achieving the objectives mentioned above, a container valve of the present invention is provided. The container valve is attached to a gas container, wherein the container valve has a pressure reducing function, and is inside a valve block in the gas container. The container valve in the valve block comprises a gas filling passage in which a filling valve is installed, a gas lead-out passage in which a lead-out valve is installed, and a pressure regulator arranged at an upstream side of the lead-out valve in the gas lead-out passage. Moreover, at least one of a safety relief valve and a pressure sensor is equipped to connect a downstream side of the filling valve in the gas filling passage. A filter is arranged at least either at an upstream side or a downstream side of the pressure regulator in the gas lead-out passage. A gas purifier is arranged at an upstream side of the pressure regulator in the gas lead-out passage. Furthermore, a check valve is arranged at an upstream side of the gas purifier.

For example, the gas filled into the gas container can be industrial gas or semiconductor gas, wherein the industrial gas is such as $H_2$, $CH_4$, $C_2H_2$, $C_2H_4$, $C_2H_6$, $C_3H_8$, n-$C_4H_{10}$, i-$C_4H_{10}$, $CH_3OH$, $C_2H_5OH$ etc. and the semiconductor gas is such as $SiH_4$, $AsH_3$, $PH_3$, $GeH_4$, $B_2H_6$, $Si_2H_6$, $SF_6$, $NF_3$, $CF_4$, $C_2F_6$, $C_4F_8$, $C_5F_8$, $C_4F_6$, $Cl_2$, HF, HCl, HBr, $ClF_3$, $NH_3$, $N_2O$, NO, He, Ar, $H_2$, $O_2$, $C_2O$ etc.

The gas mentioned above is filled into a gas container made from stainless steel, CrMo steel, carbon steel, Mn steel, Al alloy and Al lining strengthened plastic etc. It is preferred to use a cylinder whose outer diameter is greater than 50 mm and less than 1200 mm and whose length is greater than 350 mm and less than 12000 mm as the gas container. Two ends of the gas container are hot formed into a plate or concave shape. The container valve installation portion is formed onto at least one of the two ends of the container. The container valve installation portion uses a screw process so that the container valve can be installed into the gas container.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
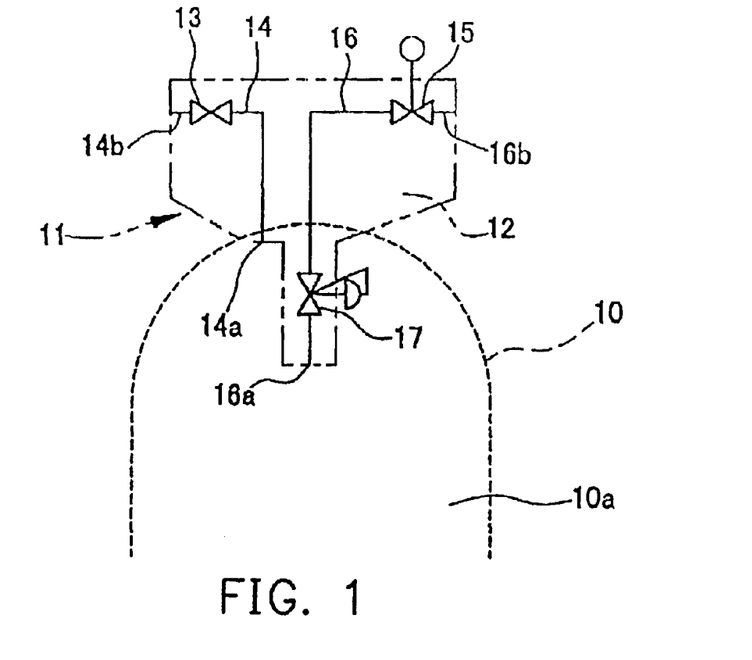
FIG. 1 is a system diagram of the container valve with pressure reducing function according to the first embodiment of the present invention.

FIG. 1 is a system diagram of the container valve with pressure reducing function according to the first embodiment of the present invention. The container valve 11 with pressure reducing function attached to a gas container 10 comprises a gas filling passage 14 in which a stop valve (filling valve) 13 is installed, a gas lead-out passage 16 in which a stop valve (lead-out valve) 15 is installed and a regulator 17. The gas filling passage 14 and the gas lead-out passage 16 are set inside a valve block 12 installed onto the gas container 10. The pressure regulator 17 is set on the upstream side (front section) of the lead-out valve 15 in the gas lead-out passage 16. The gas filling passage 14 communicates with the gas phase 10a inside the container through a gas filling outlet 14a. A filling gas inlet 14b and the gas phase 10a are separated by the filling valve 13 Moreover, the gas lead-out passage 16 communicates with the gas phase 10a inside the container through a gas lead-out inlet 16a. A gas lead-out outlet 16b and the gas phase 10a are separated by the lead-out valve 15.

When the lead-out valve 15 is opened, the high-pressure gas filled inside the gas container 10 flows into the gas lead-out passage 16 through the gas lead-out inlet 16a. The pressure of the gas is reduced to a specific pressure by the pressure regulator 17, wherein the specific pressure is set in advance. After that, the gas passes through the lead-out valve 15 and the gas is supplied to objects for consumption through the lead-out gas outlet 16. Therefore, under the condition that the lead-out valve 15 is open, the gas whose pressure is reduced to a specific pressure is led out through the container valve 11 with pressure reducing function. Even though the lead-out valve 15 is opened carelessly, the gas is not strongly sprayed with high pressure as with the conventional one. The container valve of the present invention can provide higher safety. Furthermore, the container valve can be miniaturized by making these elements integrate.

The container valve 11 with pressure reducing function as shown in this embodiment is generally installed into one of the valve installation portions of the gas container, wherein the gas container has two locations for valve installation portions. A safety relief valve or a container valve having a safety relief valve is installed into the other one of the valve installation portions.

Figure 2:
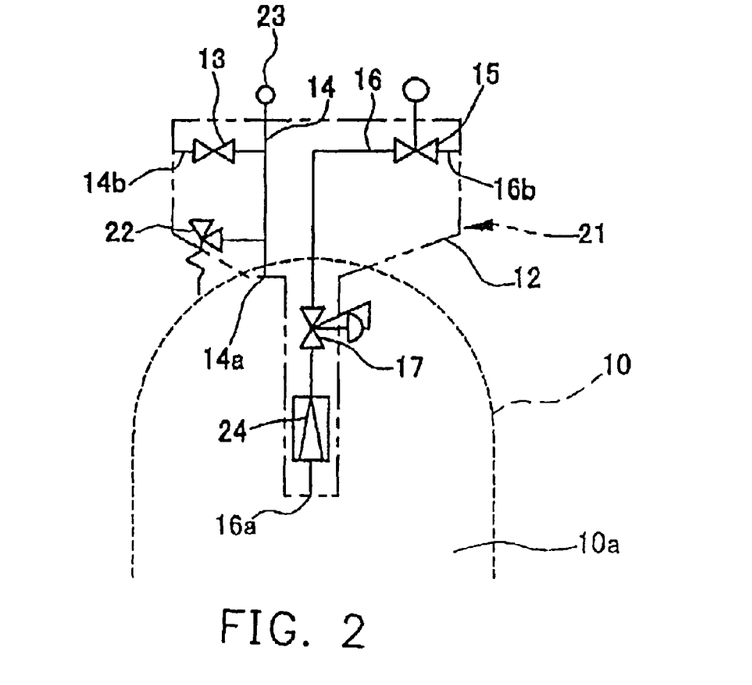
FIG. 2 is a system diagram of the container valve with pressure reducing function according to the second embodiment of the present invention.

FIG. 2 is a system diagram showing a container valve with pressure reducing function according to the second embodiment of the present invention. In the following description, for the same elements in the container valve with pressure reducing function mentioned in each embodiment with the same numerical references the explanation thereof is omitted.

In the container valve 21 with pressure reducing function as shown in this embodiment, a safety relief valve 22 is connected between the downstream side (rear section) of the filling valve 13 in the gas filling passage 14 and the gas filling outlet 14a.

The container valve 21 integrated with the safety relief valve 22 also can be installed onto the gas container that has only one location for container valve installation.

Additionally, in the container valve 21 with pressure reducing function shown in this embodiment, a pressure sensor 23 is also connected to the downstream side of the filling valve 13 in the gas filling passage 14. The pressure sensor 23 connects with the gas phase 10a inside the container through the gas filling outlet 14a so that the pressure of the gas phase 10a inside the container can be detected. By integrally assembling the pressure sensor 23 into the container valve 21, the rest of gas pressure inside the container can be managed and the timing for exchanging the container can be exactly known.

Moreover, similar to the first embodiment, in the gas container wherein a safety relief valve or a container valve having a safety relief valve is assembled in the other one of the container valve installation portions, the safety relief valve 22 can be omitted so that only the pressure sensor 23 is set. If there is no need to manage the pressure of the gas left over after use or the pressure sensor is set onto the other one of the container valve installation portions, the pressure sensor 23 can also be omitted.

Additionally, in the container valve 21 with pressure reducing function as shown in this embodiment, a filter 24 is assembled between the upstream side of the pressure regulator 17 in the gas lead-out passage 16 and the gas lead-out inlet 16a. With this structure, by setting the filter 24 into the upstream side of the pressure regulator 17, the gas leakage in the valve seat (seat leakage) of the pressure regulator 17 due to particles within the gas can be prevented.

Figure 3:
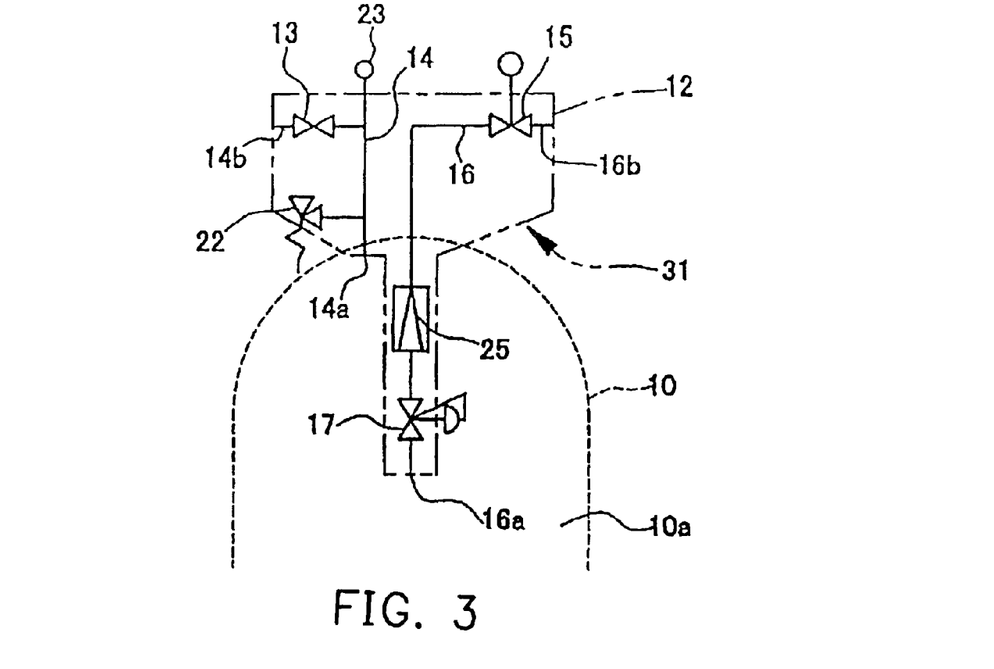
FIG. 3 is a system diagram of the container valve with pressure reducing function according to the third embodiment of the present invention.

FIG. 3 is a system diagram showing a container valve with pressure reducing function according to the third embodiment of the present invention. In the container valve 31 with pressure reducing function as shown in this embodiment, the filter 25 is assembled onto the downstream side of the pressure regulator 17 in the gas lead-out passage 16 and the upstream side of the lead-out valve 15. By setting the filter 25 onto this position, the particle inside the gas supplied to objects for consumption through the gas lead-out passage 16 can be removed.

Figure 4:
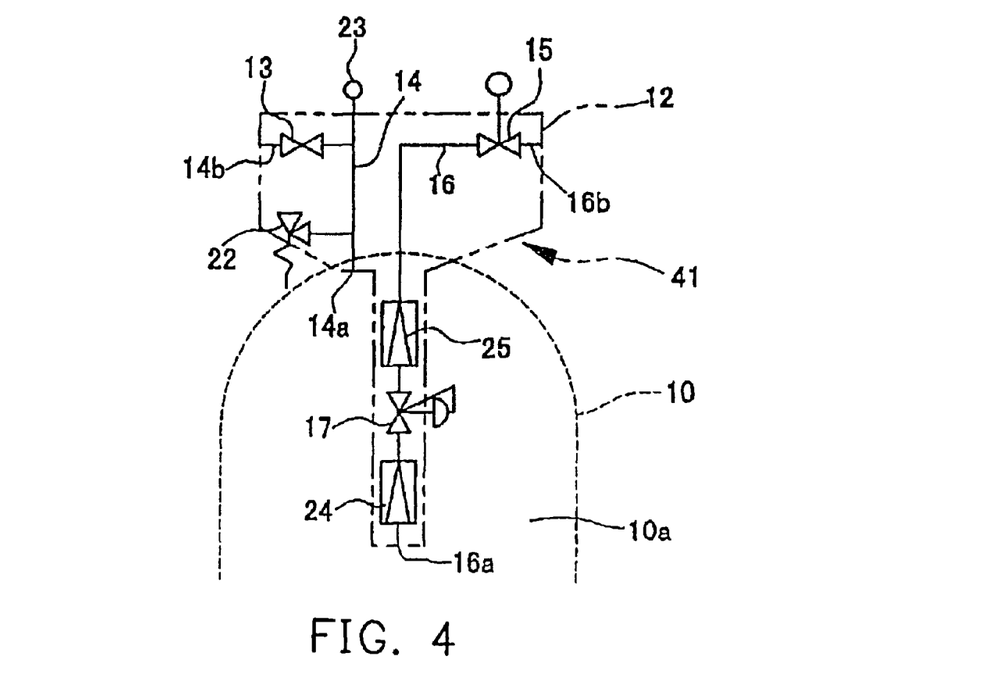
FIG. 4 is a system diagram of the container valve with pressure reducing function according to the forth embodiment of the present invention.

FIG. 4 is a system diagram showing a container valve with pressure reducing function according to the fourth embodiment of the present invention. In the container valve 41 with pressure reducing function as shown in this embodiment, the filters 24, 25 are respectively assembled onto the upstream and the downstream sides of the pressure regulator 17 in the gas lead-out passage 16. By respectively setting the filters 24, 25 onto two locations, the seat leakage of the pressure regulator 17 can be prevented. The gas can be supplied for use in high purity with the particles removed.

Figure 5:
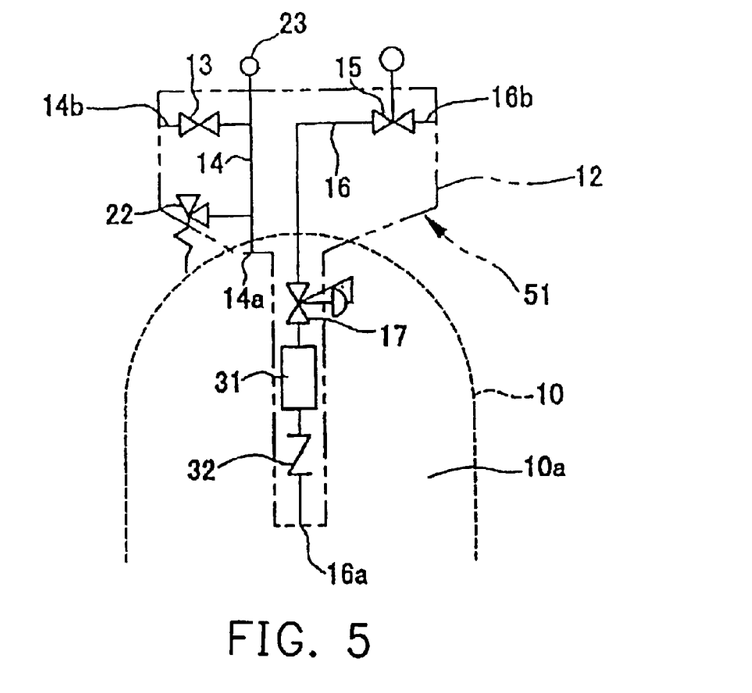
FIG. 5 is a system diagram of the container valve with pressure reducing function according to the fifth embodiment of the present invention.

FIG. 5 is a system diagram showing a container valve with pressure reducing function according the fifth embodiment of the present invention. In the container valve 51 with pressure reducing function as shown in this embodiment, a gas purifier 31 is set onto the upstream side of the pressure regulator 17 in the gas lead-out passage 16. A check valve 32 is set onto the upstream side of the gas purifier 31. By assembling the gas purifier 31 into the container valve 51, the impurities inside the gas such as oxygen, carbon monoxide, carbon dioxide and moisture etc. can be removed. This is also helpful to highly purify the gas in the semiconductor industry.

Furthermore, though the gas purifier 31 can be set at the downstream side of the pressure regulator 17, the gas purifier is usually preferred to be set at the upstream side of the pressure regulator 17 because the pressure of the gas is high so that the purifying ability of the gas purifier 31 is therefore high. Additionally, the gas purifier 31 and the filter can be combined. Moreover, the check valve 32, which prevents the impurity from returning by flowing with the gas from the gas purifier 31, can be omitted.

Figure 6:
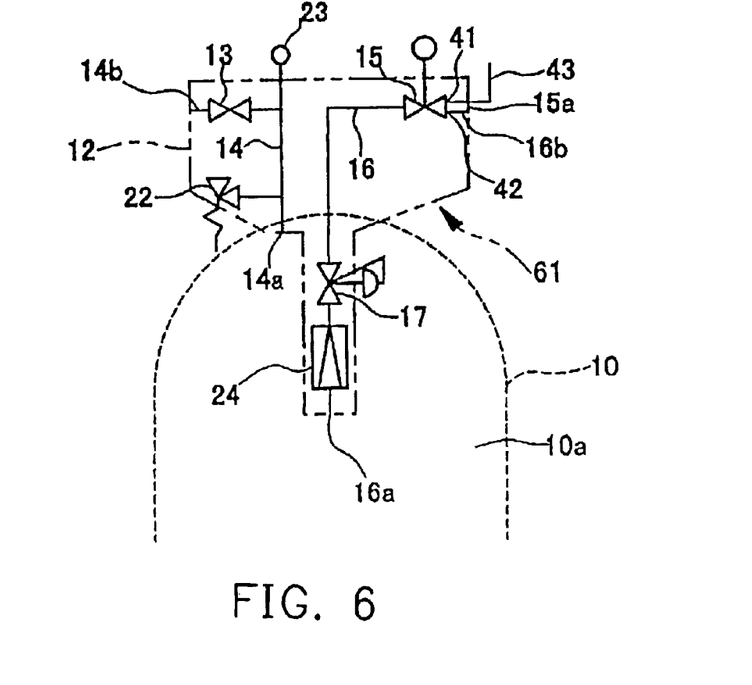
FIG. 6 is a system diagram of the container valve with pressure reducing function according to the sixth embodiment of the present invention.

FIG. 6 is a system diagram showing a container valve with pressure reducing function according to the sixth embodiment of the present invention. In the container valve 61 with pressure reducing function as shown in this embodiment, a purge gas inlet 41 and a gas supplying outlet 42 communicate with the connection portion 15a of the lead-out valve 15 through a valve seat portion. By setting the purge gas inlet 41 in this way, when the gas supplying line for the consumption equipment is connected to the gas lead-out outlet 16b, the purge gas can be led in through the purge gas lead-in passage 43 and the purge gas feeds into the gas lead-out outlet 16b through the purge gas inlet 41 and the connection portion 15a. Therefore, the connection portion 15a of the lead-out valve 15 or the gas lead-out outlet 16b can be effectively purged out.

In each container valve with pressure reducing function as shown in each embodiment, because the filling valve 13, the lead-out valve 15, the pressure regulator 17, the safety relief valve 22, the pressure sensor 23, the filters 24, 25, the gas purifier 31 and the check valve 32 etc. can be optionally assembled into the valve block 12 according to demand, the whole body of the container valve can be miniaturized. Moreover, though it is preferred that these parts are integrated inside the valve block 12, these parts can also be individually manufactured and then integrated by welding structures or connection structures in the case where connection structures are used, it is preferred to use metal surface seals applying leak-tight metal gaskets, such as VCR seal, W seal, C seal etc.

Additionally, in each valve block 12 in each embodiment, because the pressure regulator 17 and filters 24, 25 etc. are structured in a shape for inserting into the gas container 10, the container valve with pressure reducing function outside the container can be made greatly miniaturized. The filling valve 13 or the pressure sensor 23 also can be structured for inserting into the gas container. Only parts of the filling gas inlet 14b, the gas lead-out outlet 16b and the purge gas lead-in passage 43 protrude out of the container to the lead-out valve 15. Furthermore, the pressure regulator 17 is arranged protruding out of the container and the pressure of the pressure regulator 17 at its upstream side is adjustable.

The valve block 12 in the container valve with pressure reducing function can be manufactured by machining brass, stainless steel and nickel alloy etc. Generally, the stop valve (filling valve 13, lead-out valve 15) is the one of keyplate type or the one of diaphragm type. However, the one of diaphragm type is preferred because the dead space inside the valve can be effectively purged out. Moreover, it is preferred that the seat disk of each stop valve is made of polychlorotrifluorethylene (PCTFE), tetrafluoroethylene-perfluoro vinyl ether copolymer (PFA) and polyimide etc.

The driving for opening or closing each stop valve can be achieved by a manual valve or by an emergency stop valve operated by air pressure or electromagnetism. Especially, for reacting to emergency events during supplying gas, the lead-out valve 15 is preferred to be operated by air pressure or electromagnetism. The lead-out valve 15 is preferred to be operated by air pressure if the gas has inflammability or combustible-supportability.

Moreover, though a pressure regulator of spring type is generally used as the pressure regulator 17, it is preferred to use a pressure regulator of diaphragm type whose dead space is small and generates few particles. The pressure at the downstream side of the pressure regulator 17 can be generally set at a range of 100 Torr~1 MPa. If the pressure is set to be 0.1 MPa and below, it is preferred to arrange the pressure regulators in series with two sections to improve the precision of pressure control. One pressure regulator with a two-section pressure reducing function can also be used.

The safety relief valve 22 can be a rupture disc type, a spring type, a fusible-plug type or a type combined of these types. The pressure sensor 23 is chosen capable of matching the pressure of the filling gas. The pressure sensor 23 can be a Bourdon tube type, strain gauge type or semiconductor sensor type, wherein the semiconductor sensor type pressure sensor with diaphragm is preferred.

Filter media can be used to manufacture filters 24, 25, wherein the filter media is like polytetrafluoroethylene, ceramic, stainless steel, etc. When the gas is with high purity, the filter media made of stainless steel that releases little moisture is preferred. The filter capable of removing particles with diameters of 0.01~20 $\mu$m and above can be used. For preventing the seat leakage due to the particles of the pressure regulator 17, the filter 24 for 5 $\mu$m particles is used. On the other side, for supplying high purity gas with very few particles, the filter 25 for 0.01~1 $\mu$m is set at the rear section of the pressure regulator 17.

The purifier agent in the gas purifier 31 for removing the impurity within the gas can be suitably selected according to usage or the purity of the gas within the container, wherein the purifier agent is zeolite, active alumina, metal catalyst, metal oxide catalyst etc. Zeolite is preferred for removing moisture.

The whole surface of each constructing member contacting the gas is preferred to be mechanically polished, slurry polished, abrasive grains electrolytic polished, electro chemical-buffing, chemical polished, compound chemical polished etc. The surface also can be nickel-electro plating or nickel electroless plating. Moreover, nickel fluoride due to fluorination also can be formed onto the surface. If the valve block (body) is made of stainless steel, after the surface is polished and heat-treated, a passivation film also can be formed by oxide film of iron chromium or aluminum. The surface roughness i.e. $R_{max}$ of these surfaces is preferred to be 1 μm and below and is more preferred to be 0.3 μm and below.

In the container valve with pressure reducing function, an example for gas filling operation of the gas container 10 is proposed to be explained as the container valve 21 with pressure reducing function as shown in the second embodiment. First, the gas container 10 is exhausted to vacuum as follows. The filling gas inlet 14b and gas lead-out outlet 16b are respectively connected to the vacuum line. The gas container 10 is exhausted to vacuum under the condition of the filling valve 13 and lead-out valve 15 being opened. The gas and a part of the atmosphere inside the gas container 10 are exhausted till the pressure thereof is less than 1 Torr. If the gas is for semiconductor, the gas and a part of the atmosphere inside the gas container 10 are exhausted till the pressure thereof is less than 0.01 Torr. At this time, the gas container 10 can be placed at room temperature and it is preferred to heat the gas container 10 to a range of 250° C. and below. The term for exhausting the gas container to vacuum depends on its volume. After the gas container 10 is exhausted for 30 minutes~20 hours, the lead-out valve 15 is closed and the gas is filled into the gas container 10 at a specific pressure through the filling gas inlet 14b, the filling valve 13, the gas filling passage and the gas filling outlet 14a. Liquefied gas can be filled with the same filling operation. After the gas filling of the gas container 10 is finished, the gas container is checked to see whether a gas leakage exists. Then the gas lead-out outlet 16b is moved to the place of gas consumption to connect the gas supplying line of gas consumption equipment.

When the gas inside the gas container 10 is supplied to the consumption equipment, after the gas lead-out outlet 16b is connected to the gas supplying line, the purge gas with its pressure higher than the usage pressure is supplied to the gas supplying line to make sure whether a gas leakage exists. At this time, by repeat vacuuming the connection portion 15a, or repeat vacuuming the connection portion 15a and pressurizing to supply the purge gas into the connection portion 15a, or repeat pressurizing to supply the purge gas into the connection portion 15a and exhausting the connection portion 15a, the atmospheric impurity mixed into the connection portion 15a when the line was connected is completely removed. If the gas required is of high purity for the semiconductor, with the example formed as the sixth embodiment, the purge gas is supplied to the gas lead-out outlet 16b through the purge gas inlet 41 and the connection portion 15a, and the atmospheric impurities remaining in the dead space of the lead-out valve 15 can be completely removed, wherein the purge gas is nitrogen, argon, helium or hydrogen etc.

Moreover, if the gas is for semiconductors, after the atmospheric impurities are removed from the connection portion, the gas supplying line is repeat vacuumed and pressurized to be filled with the semiconductor gas. Then the purge gas is exhausted and the gas inside the gas supplying line is replaced by the gas inside the connection portion. After that, by opening the lead-out valve 15, the gas inside the gas container can be continuously supplied to the consumption equipment at a specific pressure.

If the indicator value of the pressure sensor 23 is low, after the lead-out valve 15 is closed, the gas-filling source is connected to the filling gas inlet 14b and the filling valve 13 is opened. In this way, the gas can be filled into the container on site. If the gas is not filled on site, the gas lead-out outlet 16b is repeatedly vacuumed and pressurized to supply the purge gas, so as to fill the gas lead-out outlet 16b with the purge gas. After that, the gas supplying line is disconnected and the gas container is moved to a gas filling plant to fill new gas into the gas container.

Figure 7:
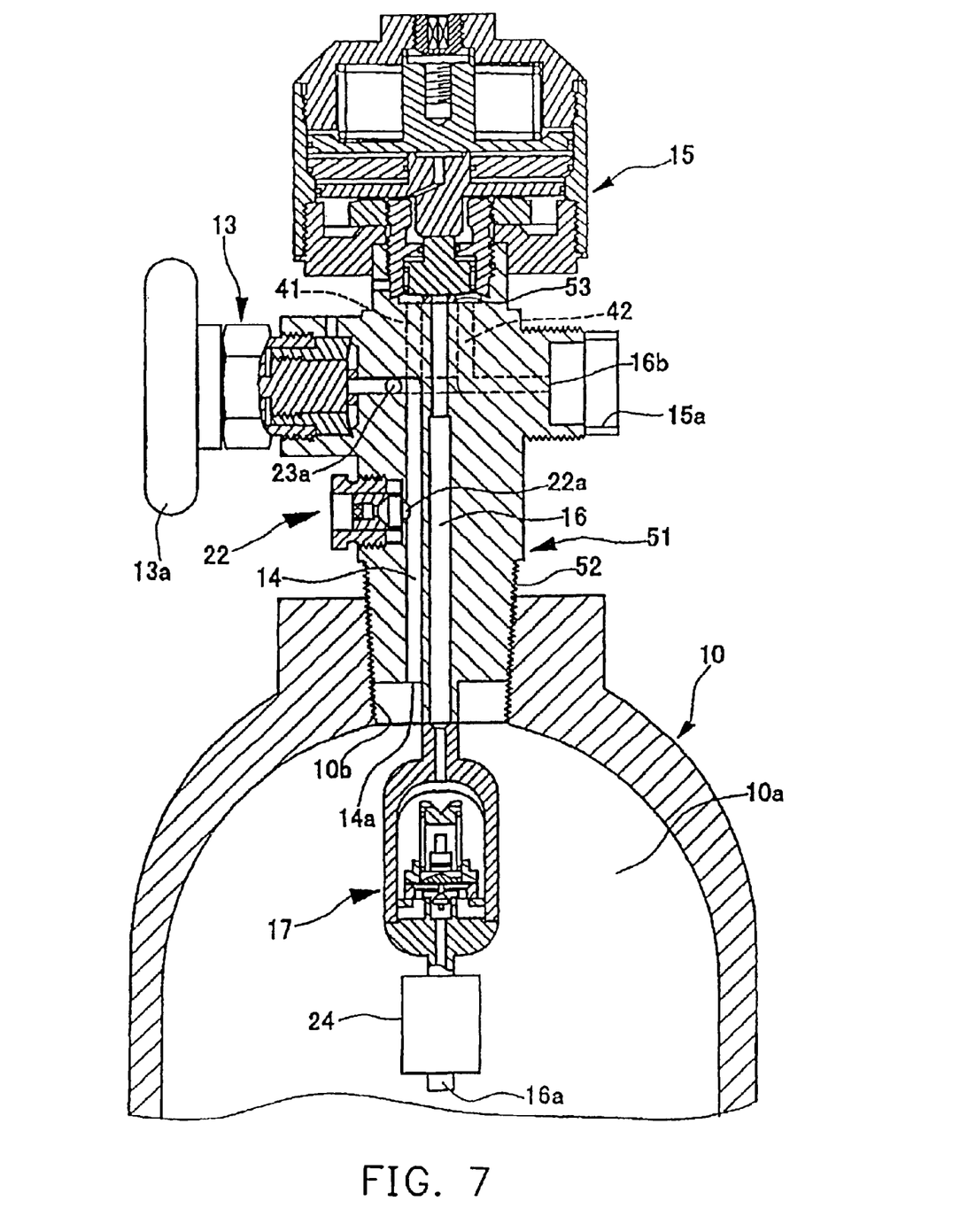
FIG. 7 is a vertical-sectional view showing a substantial example of the container valve with pressure reducing function as shown in the sixth embodiment.
Figure 8:
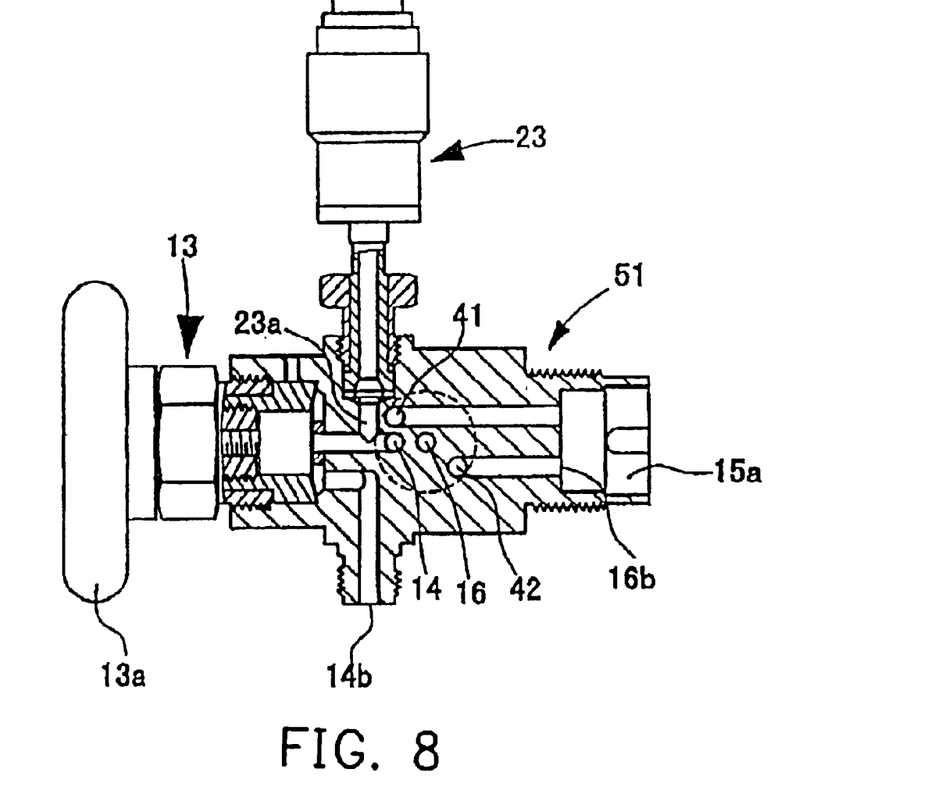
FIG. 8 is a cross-sectional view of the container valve of the sixth embodiment.
Figure 9:
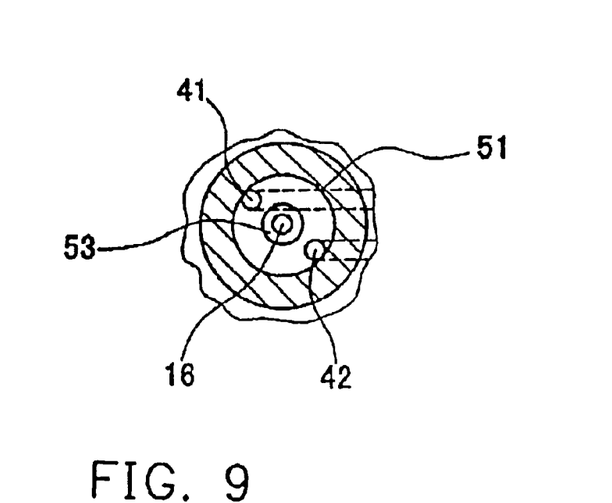
FIG. 9 is a cross-sectional view showing main parts of the lead-out valve of the sixth embodiment.

FIGS. 7 to 9 are substantial examples for the container valve with pressure reducing function as shown in the sixth embodiment, wherein FIG. 7 is a vertical-sectional view, FIG. 8 is a cross-sectional view and FIG. 9 is a cross-sectional view of the main parts in the lead-out valve.

The container valve with pressure reducing function comprises a valve body 51, a pressure regulator 17 and a filter 25, wherein the pressure regulator 17 and the filter 24 are welded and integrated to the valve body 51. The filling valve 13, gas filling passage 14, the lead-out valve 15, the gas lead-out passage 16, safety relief valve 22, pressure sensor 23, purge gas inlet 41 and the supplying gas outlet 42 are arranged in the valve body 12. The surface thereof contacting gas is electro-polished or chemical polished to a degree with $R_{max}$ equal to 1 μm for instance.

The gas container 10 is made of CrMo steel for example and the inner surface is chemical polished to a degree with $R_{max}$ equal to 1 μm. The valve body 51 is made of SUS316L. A male thread (JIS-B8244 screw) 52 is set with a female thread in the container valve installation portion lob. The filling valve 13 is a manual valve of diaphragm type and is made of SUS316L. A handle 13a is detachably formed and is disassembled when it is shipped from the gas filling plant. In the gas filling passage 14, the filling gas inlet 14b is located at the peripheral portion of the seat disk in the filling valve 13 and the gas filling outlet 14a is located at the seat disk central portion.

The lead-out valve 15 is a valve of diaphragm type made of SUS316L and is operated by air pressure. The lead-out valve 15 also serves as an emergency valve. In the lead-out valve 15, the purge inlet 41 connected to the purge gas lead-in passage and the supplying gas outlet 42 connected to the gas lead-out outlet 16b are openings located at the peripheral portion of the seat disk 53 connected to the diaphragm so that the seat disk 53 is placed in between the purge inlet 41 and the supplying gas outlet 42. At the central portion of the seat disk 53, the gas lead-out passage 16 is penetrated at the gas lead-out inlet 16a side. Additionally, the seat disk 53 is made of PCTFE.

The pressure regulator 17 is a valve of diaphragm type made of SUS316L. The pressure of the pressure regulator 17 at the downstream side thereof is set to be 0.15 MPa in advance for example. Moreover, the filter 24 is a metal filter made of SUS316L and is capable of removing particles whose diameter is 5 μm and above A fusible-plug and a rupture disc are combined to be the safety relief valve 22. The safety relief valve 22 is set to operate if the temperature is 155° C. and above or if the pressure is 25 MPa and above for example. The safety relief valve 22 is installed onto the valve body 51 so that the safety relief valve 22 is connected to the passage 22a branching from the side of the gas filling passage 14. The pressure sensor 23 is of the semiconductor sensor type with a diaphragm and is connected to the valve body 51 by the VCR connection. The pressure detecting range of the pressure sensor 23 is 0~30 MPa. The pressure sensor 23 is installed onto the valve body 51 so that the pressure sensor 23 is connected to the passage 23a branching from the side of the gas filling passage 14.

Moreover, setting the status of the gas contacting surface, the pressure of the pressure regulator 17 at its downstream side, the specific temperature of the fusible-plug and the specific pressure of the rupture disc in the safety relief valve 22, the pressure detecting range of the pressure sensor 23, the particle removing ability of the filter 24, the type of the gas filled into the gas container 10 or the usage of the gas are all dependant on the ambient during supplying gas. For example, if high purity gas is required for the semiconductor industry, the gas-contacting surface is polished till 0.1 μm in $R_{max}$ and the filter 24 has relatively high ability to remove particles.

Figure 10:
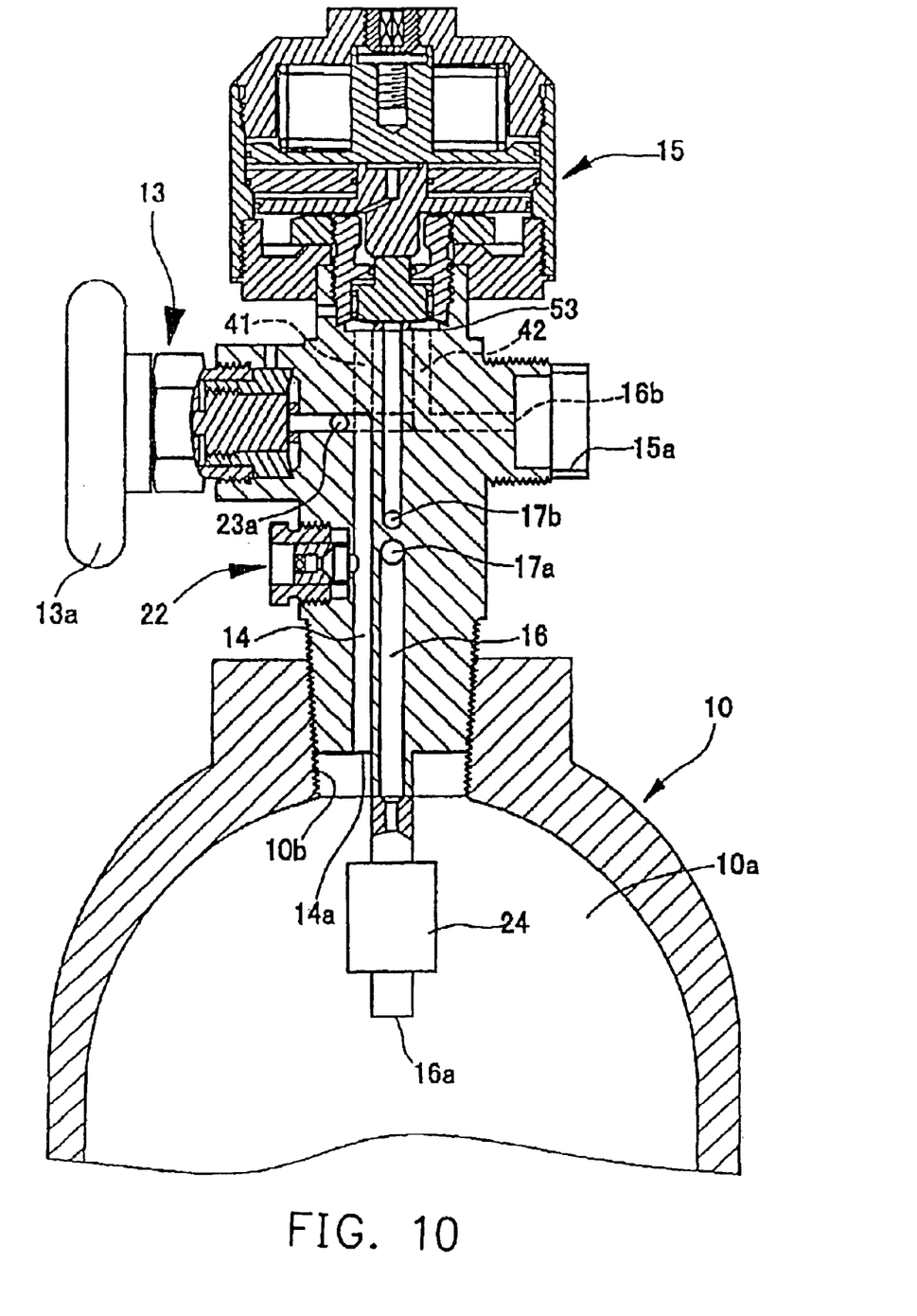
FIG. 10 is a front-sectional view showing a substantial example of the pressure regulator which can be operated outside the gas container.
Figure 11:
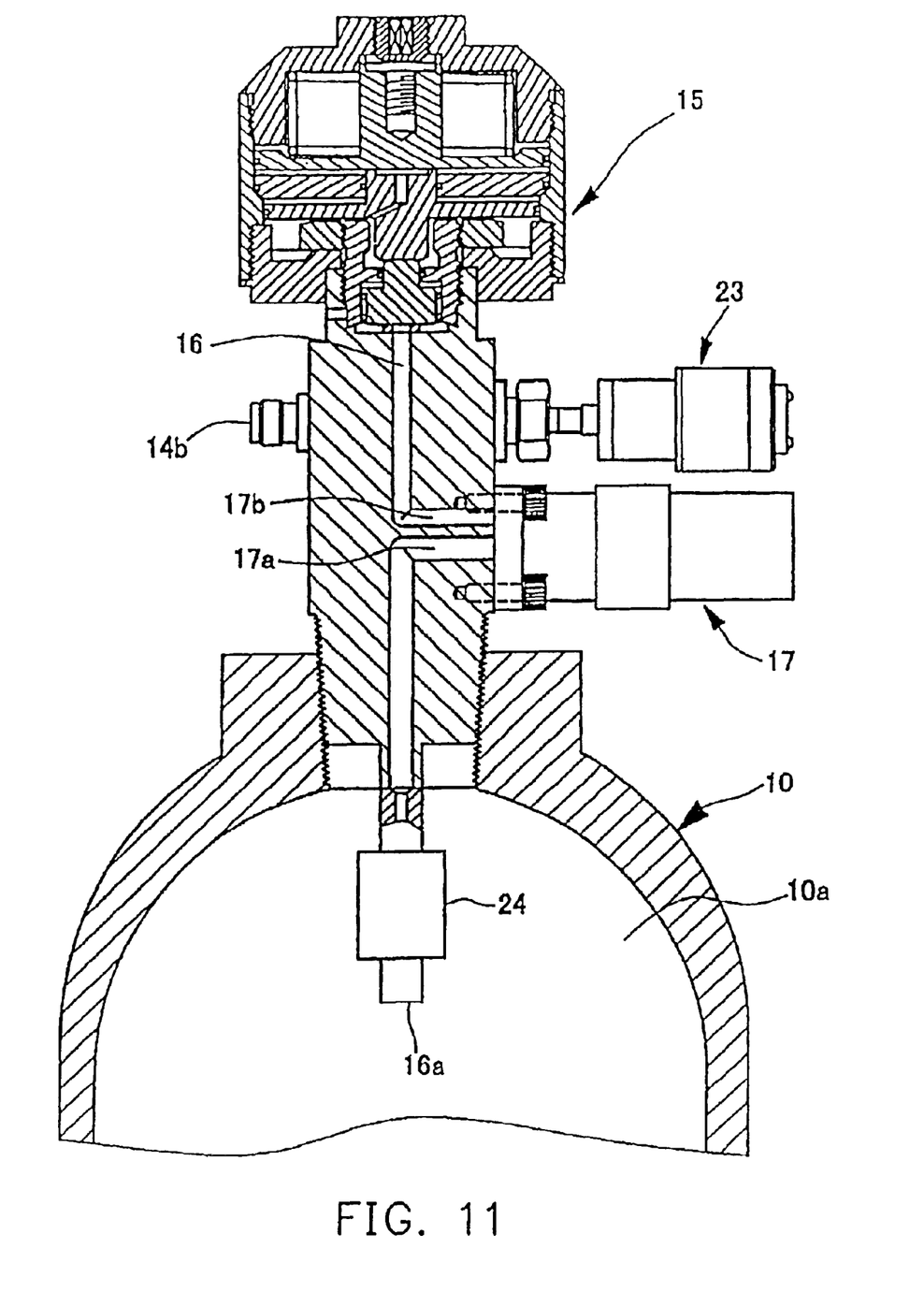
FIG. 11 is a side-sectional view showing a substantial example of the pressure regulator that can be operated outside the gas container.

FIGS. 10 and 11 are substantial examples showing that the pressure regulator 17 can be operated outside the container, wherein FIG. 10 is a front-sectional view and FIG. 11 is a cross-sectional view. Moreover, in these examples the structures, except for the installation position of the pressure regulator 17, are systematically the same as the container valve with pressure reducing function as shown in FIGS. 7 to 9.

By welding only the filter 24 to be integrated onto the front end of the valve body 51, the central portion of the gas lead-out passage 16 can be cut and can be bent outside the container of the valve body 51. The upstream and downstream sides of the pressure regulator 17 are respectively connected to the bent passages 17a and 17b. In this way, by arranging the pressure regulator 17 outside the container, the pressure of the pressure regulator 17 at its downstream side can be adjusted according to demand while supplying gas.

With the structure of the container valve with pressure reducing function according the present invention, it is safe to supply various gases with inflammability, spontaneous flammability, toxicity, corrosiveness and combustion-supportability characteristics. Furthermore, the gas with high quality and high purity can be supplied by assembling the filter or the purifier. Additionally, the container valve can be made miniaturized by integrally assembling the pressure regulator etc. The portion outside the container can be made greatly miniaturized by inserting portions of parts into the gas container.

While the present invention has been described with a preferred embodiment, this description is not intended to limit our invention Various modifications of the embodiment will be apparent to those skilled in the art. It is therefore contemplated that the appended claims will cover any such modifications or embodiments as fall within the true scope of the invention.

What claimed is:

1. A container valve, attached to a gas container, wherein the container valve has a pressure reducing function, and is inside a valve block in the gas container, and in the valve block the container valve comprising:
   a gas filling passage, in which a filling valve is installed,
   a gas lead-out passage, in which a lead-out valve is installed; and
   a pressure regulator, arranged at an upstream side of the lead-out valve in the gas lead-out passage,
   wherein a gas purifier is arranged at an upstream side of the pressure regulator in the gas lead-out passage, and a check valve is arranged at an upstream side of the gas purifier so as to prevent impurity from entering the gas container from the gas purifier.

2. A container valve, attached to a gas container, wherein the container valve has a pressure reducing function, and is inside a valve block in the gas container, and in the valve block the container valve comprising:
   a gas filling passage, in which a filling valve is installed,
   a gas lead-out passage, in which a lead-out valve is installed; and
   a pressure regulator, arranged at an upstream side of the lead-out valve in the gas lead-out passage,
   wherein the lead-out valve in the gas lead-out passage is a diaphragm type valve, a seat disk is connected to a diaphragm of the lead-out valve, and an opening in the seat disk serves as a purge inlet.

3. A container valve, attached to a gas container, wherein the container valve has a pressure reducing function, and is inside a valve block in the gas container, and in the valve block the container valve comprising:
   a gas filling passage, in which a filling valve is installed,
   a gas lead-out passage, in which a lead-out valve is installed; and
   a pressure regulator, arranged at an upstream side of the lead-out valve in the gas lead-out passage,
   wherein the filling valve is a diaphragm type valve.

* * * * *